May 10, 1966   R. M. McCLINTOCK   3,250,558
FLUSH MOUNTING LATCH

Filed Jan. 4, 1965   4 Sheets-Sheet 2

INVENTOR
R. M. McCLINTOCK
BY
ATTORNEYS

May 10, 1966 R. M. McCLINTOCK 3,250,558

FLUSH MOUNTING LATCH

Filed Jan. 4, 1965 4 Sheets-Sheet 1

INVENTOR
R. M. McCLINTOCK

ATTORNEYS

May 10, 1966  R. M. McCLINTOCK  3,250,558
FLUSH MOUNTING LATCH

Filed Jan. 4, 1965  4 Sheets-Sheet 4

INVENTOR
R. M. McCLINTOCK
BY Kenyon, Palmer, Stewart
& Estabrook
ATTORNEYS 3,250,558
FLUSH MOUNTING LATCH
Robert M. McClintock, Canoga Park, Calif., assignor to Aerpat Aktien Gesellschaft, Glarus, Switzerland, a corporation of Switzerland
Filed Jan. 4, 1965, Ser. No. 425,379
6 Claims. (Cl. 292—229)

This application is a continuation-in-part of my application Serial No. 334,416, filed December 30, 1963, now abandoned.

The present invention relates to a latch mechanism for releasably holding a closure member such as a door, hatch cover or the like in a position closing an opening in a wall or panel, and the invention more particularly pertains to a latch assembly which in the secured position is flush with the exterior surface of the closure member.

It is an object of the invention to provide a latch mechanism wherein the locking member or bolt is mounted for swinging movement with an arm serving as a lever to provide mechanical advantage in moving the closure member against its abutment by the swinging of the lever to a position flush with the exterior of the closure member.

Another object of the invention is to provide a flush type latch assembly involving a minimum number of parts which may be readily manufactured and assembled to provide a latch mechanism wherein the bolt may be readily released for movement to an unlocked position, whereby the closure member may be moved to a position clearing the opening.

Other objects and features of the invention will be appreciated and become apparent to those skilled in the art as the present disclosure proceeds and upon consideration of the following detailed description taken in conjunction with the accompanying drawings wherein exemplary embodiments of the invention are disclosed.

In the drawings:

FIG. 9 is a plan view on an enlarged scale of the bracket for the latch of FIGS. 7 and 8.

FIG. 10 is a side view of FIG. 9, and FIG. 11 is an end view of FIG. 10 as seen from the right of FIG. 10.

The present invention relates to a device known as a flush type latch for use in connection with doors of various types, hatch covers, and with closures for openings in walls, panels or the like. Although the latch mechanism of the present invention is applicable to doors of various types, it is particularly useful for closure members which are intended to be open from one side. The latch mechanism in association with a closure member not only provides a desirable appearing device, but also provides an advantage from a safety standpoint in that it does not include any projections beyond the exterior surface of the closure member which are likely to be struck by objects moving relative thereto along the exterior surface of the closure member.

Figure 2:
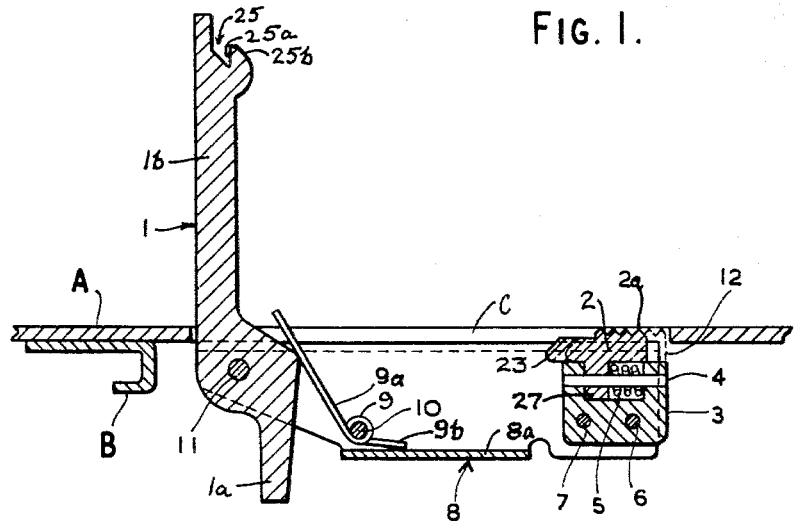
FIG. 2 is a similar view showing the latch mechanism in the released position.
Figure 3:
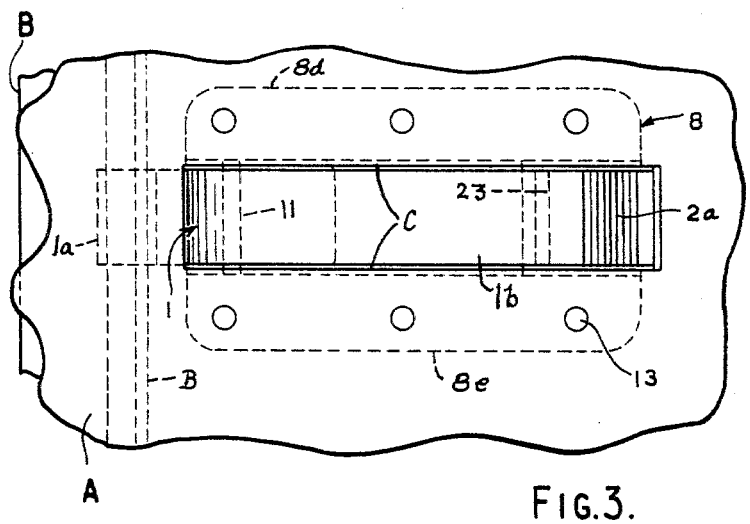
FIG. 3 is a fragmentary exterior view of a closure member showing the latch mechanism applied thereto.

In embodiments illustrated in the drawings, a closure member is represented at A which is to be releasably held in engagement with a frame member B and which frame serves as an abutment member for the closure member A. The closure member A may take the form of a hinged door or a hatch cover plate or the like. The closure member A is provided with an elongated rectangular shaped slot C adjacent a portion of frame B as best shown in FIGS. 2 and 3.

Figure 4:
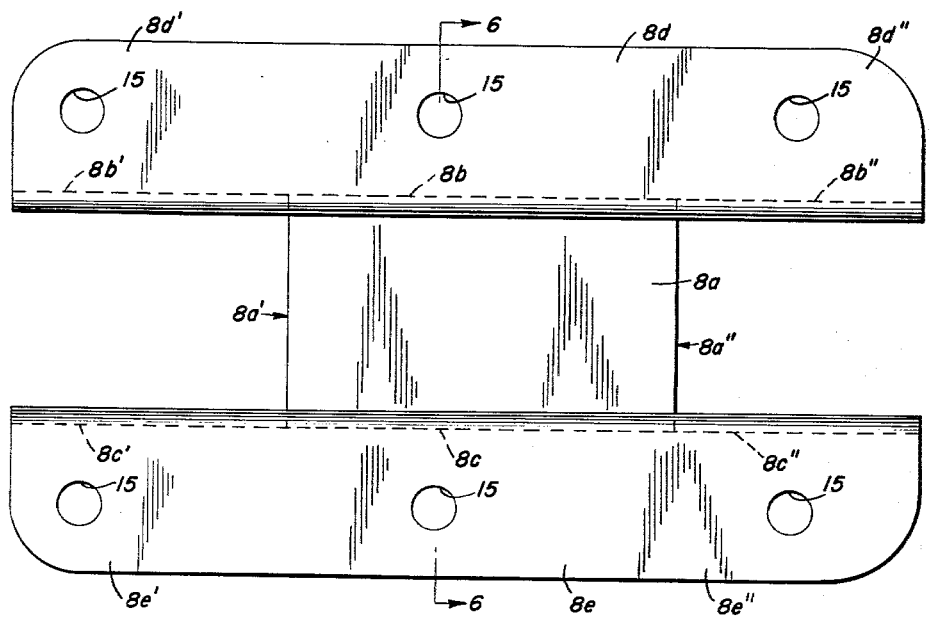
FIG. 4 is a plan view on an enlarged scale of a bracket for supporting elements of the latch mechanism.
Figure 5:
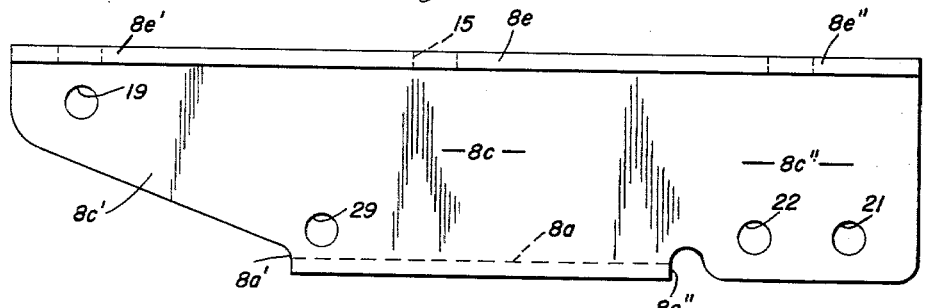
FIG. 5 is a side elevational view of the bracket.
Figure 6:
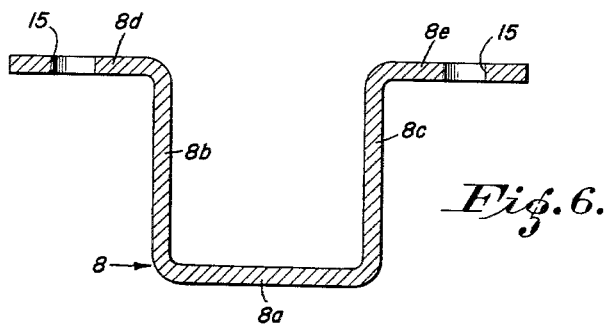
FIG. 6 is a transverse sectional view taken on the line 6—6 of FIG. 4.

A latch mechanism exhibiting the invention includes a supporting bracket 8 which is shown in detail in FIGURES 4 to 6. The bracket may be formed from a single sheet of metal by suitable metal cutting and forming operations. As shown in FIGURES 4 to 6, the middle portion of the bracket is of U-shaped channel section formed of a bottom wall or web 8a having two parallel side walls 8b and 8c extending upwardly from opposite side thereof, and mounting flanges 8d and 8e extend outwardly from the upper edges of side walls 8b and 8c, respectively. As shown in FIGURES 4 and 5, the web 8a is terminated at one end 8a' so that it is considerably shorter than the side walls 8b and 8c, and it is also terminated at the other end 8a" so that it is shorter than the side walls 8b and 8c, for purposes to be explained below. The portions of the side walls and mounting flanges extending beyond the end 8a' of the web 8a are designated as extensions 8b', 8c', 8d' and 8e'. Likewise, the portions of the side walls and mounting flanges extending beyond the end 8a" of the web 8a are designated as extensions 8b", 8c", 8d" and 8e".

The bracket 8 is secured to the back face of the closure member A, with the side walls 8b and 8c and the flanges 8d and 8e arranged on opposite sides of the slot C. The bracket is held in position by suitable means such as rivets 13 extending through openings 15 in the flanges 8d and 8e. The open area between the side walls 8b and 8c of the bracket 8 is such that when the bracket 8 is secured in position no portion of the bracket obstructs the elongated slot C formed in the closure member A.

It will be noted that the bracket 8 is formed of two angle sections 8c–8e and 8b–8d which are joined together by a web piece 8a which is shorter than the two angle pieces.

Figure 1:
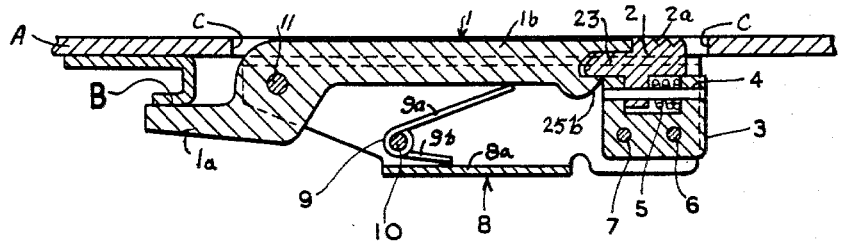
FIG. 1 is a sectional view of a latch mechanism exhibiting the invention and taken on the line 1—1 of FIG. 3, the latch being shown in secured or locked position.

A latch member or bolt 1 is mounted for pivotal movement at one end of the bracket 8. In the embodiment illustrated a pin 11 extends through the bolt 1 at a point intermediate its ends and through openings 19 formed in the side wall extensions 8b' and 8c' of the bracket 8. The bolt 1 has an end portion 1a comprising a latch portion which engages the rear face of the frame member B when the bolt is in latched position, as shown in FIGURE 1, and the other end portion 1b of the bolt constitutes an operating lever portion which substantially fills the major portion of the slot C when the bolt is in latch position. As shown, the lever 1b is substantially flush with the outer face of the closure member A when the bolt is latched.

A guide block 3 is mounted between the side wall extensions 8b" and 8c" at the opposite end of the bracket 8 by means of pins 6 and 7 which extend through openings 21 and 22 in the side walls of the bracket 8. The guide block 3 is of such transverse dimension as to fit snugly between the side wall portions 8b" and 8c".

A trigger or keeper member 2 is mounted on the guide block 3 for movement relative thereto. The keeper member 2 has an integral portion extending into the slot C between the end of the bolt lever 1b and the end of the slot C. The face of the keeper member 2 which is exposed through the slot C is serrated or otherwise roughened as shown at 2a to facilitate movement of the member by engagement of a finger with the serrated portion. The keeper member 2 is provided with a tongue 23 which extends towards the end of lever portion 1b and is positioned to enter a slot 25 formed in the end of the bolt lever 1b. The lower wall 25a of the slot 25 engages the lower face of tongue 23 and holds the latch in the closed position shown in FIG. 1. A lug 27 carried by the member 2 extends into a cavity formed in the guide block 3. A pin 4 extends through an opening in the lug 27 and openings in the guide block 3 and constrains the keeper member or trigger 2 in operative association with the guide block and guides the keeper member in a linear path parallel with the slot C. A helical compression spring 5 surrounds the pin 4 and one end abuts the guide block 3 while the other end of the spring is in abutting relationship with the lug 27 to urge the keeper member 2 into latching position, to the left in FIGS. 1 and 2.

A spring 9 is provided urging the bolt 1 to rotate in a counterclockwise direction about the pin 11 when the trigger or keeper member 2 is retracted from the position shown in FIG. 1. The spring may be of a helical type supported on a pin 10 which extends through openings 29 formed in the side walls 8b and 8c of the bracket 8. A leg 9a forming one end of the spring is adapted to engage the inner face of the bolt 1 as shown in FIG. 1 and the other leg 9b of the helical spring engages the web portion 8a of the bracket 8.

As explained above, bolt section 1b functions as a lever and the latch section 1a engages the frame member B when the bolt is rotated in a clockwise direction from the position shown in FIG. 2 to the latched position of FIG. 1 to clamp the closure member A to the frame member B. As lever 1b approaches the latched position, the free end of the tongue 23 is engaged by the inclined cam surface 25b formed on the end portion of the lever arm which forms shoulder 25a. The tongue 23 is moved rearwardly by cam 25b until slot 25 is opposite the tongue 23 which then enters the slot 25 and engages the shoulder 25a to hold the bolt in latched position with its outer surface substantially flush with the outer face of the closure member A. The spring 5 normally maintains the trigger or keeper member 2 in a position to retain the bolt in the latched position shown in FIG. 1. when the keeper member or trigger 2 is moved to the right from the position in FIG. 1 to the position 12 in FIG. 2, the tongue 23 clears the shoulder 25a, and the leg 9a of the spring 9 acts against the lever arm 1b of the bolt 1 so that the bolt turns in a counter-clockwise direction to a position shown in FIG. 2. When the bolt arrives in the position shown in FIG. 2 the lever 1b may be used as a handle to pull the closure member A to an open position.

A further modification is illustrated in FIGURES 7 to 11 of the drawing. In this arrangement elements which serve the same functions as elements shown in FIGURES 1 to 6 are represented by the same reference characters.

Figure 7:
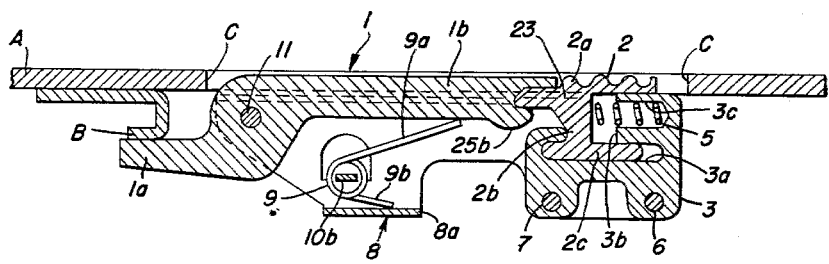
FIGURES 7 to 11 show a second embodiment of the invention, FIGS. 7 and 8 being views similar to FIGS. 1 and 2.
Figure 8:
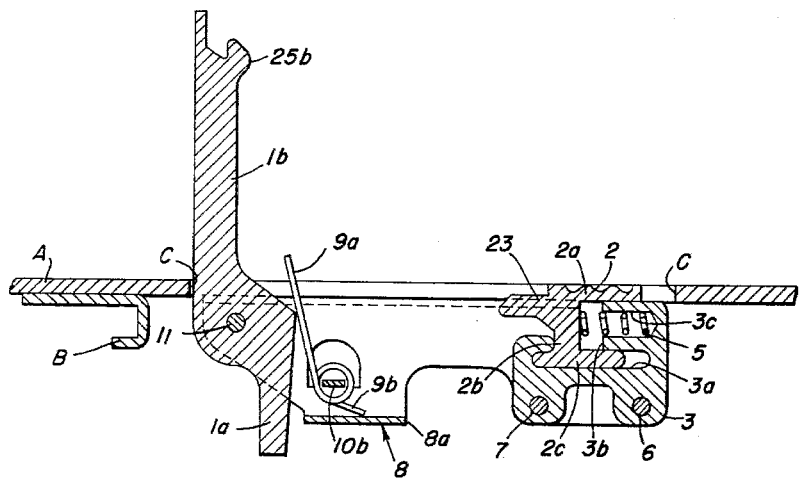
Figure 9:
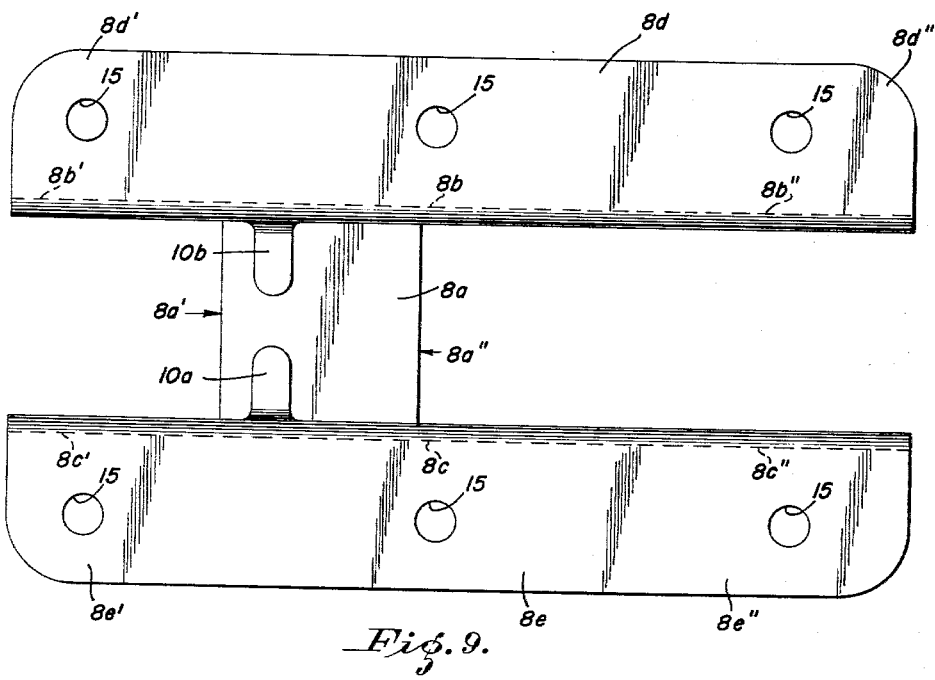
Figure 10:
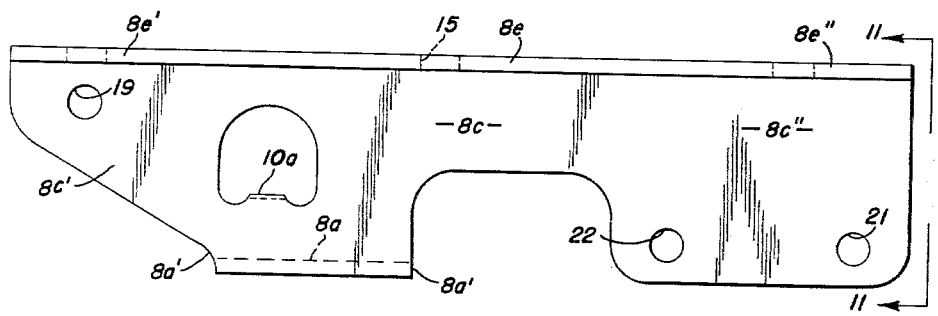
Figure 11:
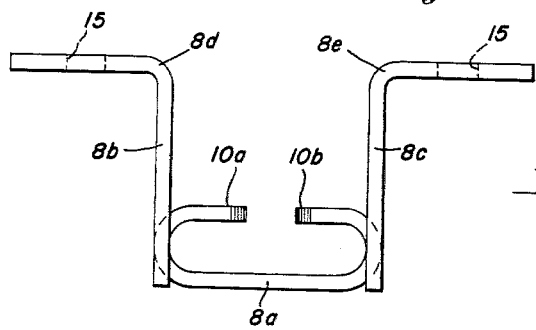

The arrangement shown in FIGURES 7 to 11 is essentially like the arrangement shown in FIGURES 1 to 6 with two main points of difference as follows:

(1) The arrangement for mounting the keeper member 2 for sliding movement towards and away from the end of the bolt 1 has been modified to eliminate the need for the pin 4 shown in FIGURES 1 and 2. In FIGURES 7 and 8, the keeper member 2 is mounted upon the supporting block 3 which is secured between the side walls of the bracket 8 by pins 6 and 7. The arrangement for mounting the keeper member upon the block 3 differs from that shown in FIGURES 1 and 2. The rear portion of the block 3 extends up to the plane of the lower face of the closure member A and provides a seat for the portion 2a of the keeper member 2 which is located within the slot C. The keeper member 2 is provided with a downwardly extending stem portion 2b which carries at its lower end a horizontal plate portion 2c which is located within a horizontal slot 3a formed in the block 3. The stem 2b passes vertically through an opening 3b in the block 3, and portions of the block 3 located above the plate section 2c of the keeper member 2 serve to prevent the keeper member from moving out of the slot 3a under the action of the spring 9. The biasing spring 5 for urging the keeper member 2 into latching position with respect to the bolt 1 is located within a bore 3c formed in the upper portion of the block 3, in the manner shown.

It will be understood that the slot 3a extends entirely across the width of the block 3, so that the plate portion 2c may be mounted within the slot 3a before the block 3 is mounted in position between the side walls of the channel bracket 8. It will be understood that the spring element 5 is mounted within the bore 3c before the keeper member 2 is placed in position on the block 3.

(2) The arrangement for mounting the spring 9 between the side walls of the mounting bracket has been modified so as to eliminate the use of the mounting pin 10 shown in FIGS. 1 and 2 of the drawing. Instead of using this pin, the spring is mounted upon two inwardly extending tongues 10a and 10b which are punched or struck from the side walls of the mounting bracket, there being a gap between the ends of the tongues to facilitate the mounting of the spring on the tongues.

One feature of the present invention is that the keeper member 2 moves parallel with the plane of the closure A, and no part of the keeper member projects above or beyond the outer surfaec of the closure A, to any appreciable extent, in any position of the keeper.

While the structures illustrated in the drawings represent suitable embodiments of the latch mechanism, modifications in the elements as well as in the general organization may be made without departing from the scope ot the invention as set forth in the appended claims.

I claim:

1. A latch mechanism for releasably holding a closure member in fixed relationship to a frame member comprising, a plate-like closure member having an elongated slot therethrough, a bracket having flanges extending along the inner face of the closure member and secured thereto, said bracket having an open central area between the flanges registering with said slot, a bolt mounted for pivoting movement on said bracket, said bolt having a latch arm located on the back side of said closure member and positioned to engage the frame member when the bolt is in latched position, said bolt also having a longer arm extending through said slot and forming an operating lever for the bolt, said lever being located within said slot with its outer surface substantially flush with the outer face of said closure member when the bolt is in latched position, a keeper member carried by said bracket and located adjacent the free end of said lever, support means carried by said bracket and supporting and constraining said keeper member for sliding movement towards and away from the end of said lever in a plane parallel with the outer surface of said closure member, said keeper member having an integral actuating portion which is accessible through an opening in said closure member, a shoulder on the bolt lever engaged by said keeper member to latch the lever in latching position, first spring means normally urging said keeper member into latching engagement with said lever, and separate spring means supported by said bracket and engaging the bolt and operating to rotate the bolt about its pivot to a position to release the latch mechanism when the keeper member is retracted from said shoulder.

2. A latch mechanism according to claim 1 wherein said bolt is pivotally supported on side walls of said bracket at one end thereof, and said support means for said keeper comprises a supporting block secured between the side walls of said bracket at the other end thereof.

3. A latch mechanism according to claim 1 wherein said support means for said keeper member comprises a supporting block mounted on the back side of said closure member and having a flat face adjacent said closure plate and arranged in parallel spaced relation with said closure plate, said block having a cavity opening through said flat face, said keeper member having a flat face supported on the flat face of said block for sliding movement of the keeper member parallel with the said closure member, said keeper member having a lug extending into said cavity, a guide pin supported by said block and passing lengthwise through said cavity parallel with said slot and passing through a guiding hole formed in said lug, and a compression spring surrounding said pin within said cavity and acting upon said lug to bias said keeper member into latching position.

4. A latch mechanism according to claim 1 wherein said support means for said keeper member comprises a supporting block mounted between the side walls of said bracket, said block having a horizontal slot formed throughout its width and located below and parallel with the lower face of said closure member, said keeper member having a supporting plate portion located within said horizontal slot of said block and being movable therein, and a supporting stem extending upwardly from said supporting plate through an opening in said block to said actuating portion, said keeper member with its actuating portion and its supporting plate portion being movable towards and away from the end of said bolt.

5. A latch mechanism according to claim 1 wherein said spring means for rotating the bolt comprises a helical spring arranged between the side walls of said bracket with one end portion engaging said bracket and the other end portion engaging the bolt, said bracket having integral tongue portions struck from the side wall thereof and extending inwardly into the helical body portion of said spring.

6. A latch mechanism according to claim 1 wherein said first spring means comprises a torsion spring having one end portion engaging said bracket and the other end portion engaging said bolt, and said separate spring means comprises a helical compression spring with one end engaging said keeper member and the other end portion engaging said support means.

References Cited by the Examiner

UNITED STATES PATENTS 2,717,796 9/1955 Cudney.
2,873,495 2/1959 Love _____ 24—68

FOREIGN PATENTS 747,263 1/1945 Germany.

PATRICK A. CLIFFORD, *Primary Examiner.*

RICHARD E. MOORE, *Examiner.*